(12) United States Patent
Elazzami et al.

(10) Patent No.: US 12,386,954 B2
(45) Date of Patent: Aug. 12, 2025

(54) EMBEDDED CONTROLLER METHOD FOR PREVENTION OF DENIAL OF SERVICE ATTACKS

(71) Applicant: Dell Products L.P., Round Rock, TX (US)

(72) Inventors: Bassem Elazzami, Austin, TX (US); Ibrahim Sayyed, Georgetown, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 18/310,142

(22) Filed: May 1, 2023

(65) Prior Publication Data
US 2024/0370555 A1    Nov. 7, 2024

(51) Int. Cl.
*G06F 21/55*    (2013.01)
*G06F 21/60*    (2013.01)

(52) U.S. Cl.
CPC .......... *G06F 21/554* (2013.01); *G06F 21/552* (2013.01); *G06F 21/602* (2013.01)

(58) Field of Classification Search
CPC ..... G06F 21/554; G06F 21/552; G06F 21/602
USPC ............................................................. 726/22
See application file for complete search history.

(56) References Cited

U.S. PATENT DOCUMENTS

| | | | |
|---|---|---|---|
| 2016/0055332 A1* | 2/2016 | Jeansonne | G06F 9/4406 726/22 |
| 2017/0300692 A1* | 10/2017 | Robison | G06F 21/566 |
| 2018/0324027 A1* | 11/2018 | Kondapi | H04L 41/046 |
| 2021/0255939 A1* | 8/2021 | Chaiken | G06F 11/0757 |
| 2022/0066530 A1* | 3/2022 | Nakamura | G06F 1/329 |
| 2024/0419784 A1* | 12/2024 | Cohen | G06F 21/51 |

* cited by examiner

*Primary Examiner* — Badri Narayanan Champakesan
(74) *Attorney, Agent, or Firm* — Jackson Walker L.L.P.

(57) ABSTRACT

An information handling system may include at least one host processor and an embedded controller (EC) including an EC processor. The information handling system may be configured to: execute an application on the at least one host processor; provide a communication channel between the application and the EC, wherein the application is configured to issue input/output (I/O) requests to the EC; execute an application handler on the EC processor, wherein the application handler is configured to: create records indicating the I/O requests and times associated with the I/O requests; and respond to the I/O requests based on the records and based on a per-application policy.

15 Claims, 3 Drawing Sheets

EMBEDDED CONTROLLER METHOD FOR PREVENTION OF DENIAL OF SERVICE ATTACKS

TECHNICAL FIELD

The present disclosure relates in general to information handling systems, and more particularly to the prevention of denial-of-service (DOS) attacks with regard to embedded controllers (ECs) in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include an embedded controller (EC), which may be implemented with a microcontroller configured to carry out various low-level system tasks. ECs may support one or more data paths accessible from an operating system (OS) or an application, such as memory-mapped input/output (MMIO) using a kernel driver, Windows Management Instrumentation (WMI), ACPI source language (ASL), etc.

Regardless of the particular data path being used, in some implementations, applications can invoke large numbers of I/O requests without limit. This allows problems to arise when some application (intentionally or not) overuses the EC I/O, for example, essentially causing a denial-of-service (DOS) attack. This can impact other applications' access to EC services, which can starve them of EC availability. It can also overload the EC with excessive processing, resulting in sluggish EC responses for other tasks (e.g., time-sensitive tasks like keyboard processing). In implementations that use system management interrupt (SMI) EC I/O handling, excessive SMI time can result in audio/video glitching, as well as failure of other time-sensitive OS tasks.

Embodiments of this disclosure may improve on current solutions, mitigating or eliminating the possibility of EC DoS issues.

It should be noted that some terms discussed herein are described in the Advanced Configuration and Power Interface (ACPI) Specification version 6.5, which was released in August Specification), which is hereby 2022 (hereinafter, ACPI incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with embedded controller denial-of-service issues may be reduced or eliminated.

In accordance with embodiments of the present disclosure, an information handling system may include at least one host processor and an embedded controller (EC) including an EC processor. The information handling system may be configured to: execute an application on the at least one host processor; provide a communication channel between the application and the EC, wherein the application is configured to issue input/output (I/O) requests to the EC; execute an application handler on the EC processor, wherein the application handler is configured to: create records indicating the I/O requests and times associated with the I/O requests; and respond to the I/O requests based on the records and based on a per-application policy.

In accordance with these and other embodiments of the present disclosure, a method may include an information handling system executing an application on at least one host processor thereof; the information handling system providing a communication channel between the application and an embedded controller (EC) thereof, wherein the application is configured to issue input/output (I/O) requests to the EC; the information handling system executing an application handler on an EC processor of the EC, wherein the application handler is configured to: create records indicating the I/O requests and times associated with the I/O requests; and respond to the I/O requests based on the records and based on a per-application policy.

In accordance with these and other embodiments of the present disclosure, an article of manufacture may include a non-transitory, computer-readable medium having computer-executable code thereon that is executable by an information handling system for: executing an application on at least one host processor thereof; providing a communication channel between the application and an embedded controller (EC) of the information handling system, wherein the application is configured to issue input/output (I/O) requests to the EC;

executing an application handler on an EC processor of the EC, wherein the application handler is configured to: create records indicating the I/O requests and times associated with the I/O requests; and respond to the I/O requests based on the records and based on a per-application policy.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
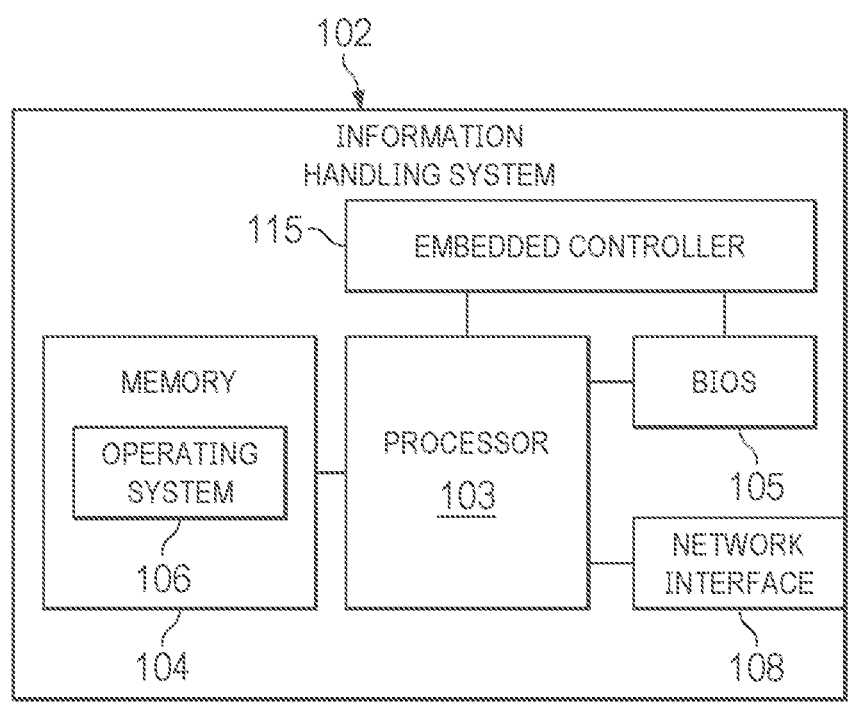
FIG. 1 illustrates a block diagram of an example information handling system, in accordance with embodiments of the present disclosure.
Figure 2:
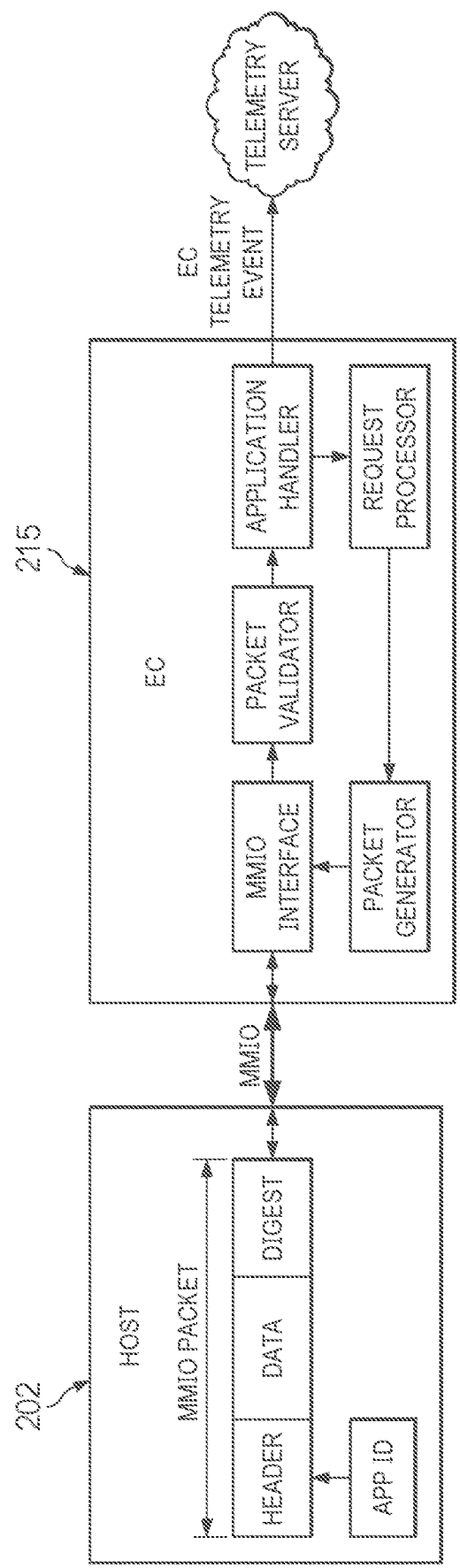
FIG. 2 illustrates a block diagram of an EC application handler interacting with an application executing on a host system.
Figure 3:
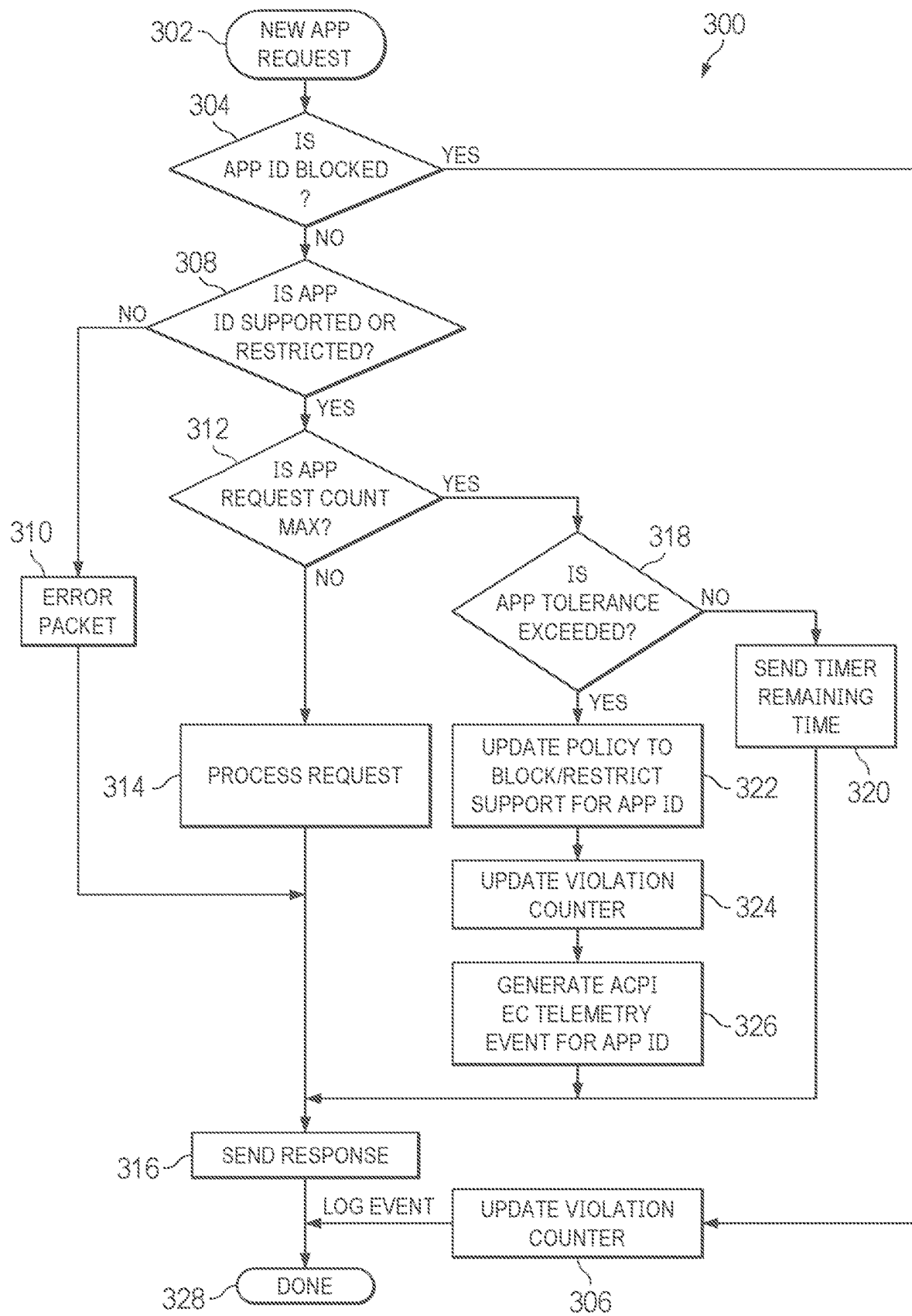
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), a remote access controller (e.g., a Dell Remote Access Controller (DRAC) or Integrated Dell Remote Access Controller (iDRAC)), or an embedded controller (EC).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may further include a management controller such as embedded controller (EC) 115. EC 115 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. EC 115 may be configured to provide management functionality for the management of information handling system 102. Such management may in some embodiments be made by EC 115 even if information handling system 102 is powered off or powered to a standby state. EC 115 may include a processor, a memory, and a network interface that may be separate from and physically isolated from network interface 108 in some embodiments. EC 115 may be coupled to a management network, which may be separate from and physically isolated from the data network coupled to network interface 108.

In some embodiments, EC 115 may be a microcontroller with its own memory, and it may be used to manage any of various low-level system tasks within information handling system 102.

EC 115 may be communicatively coupled to processor 103, BIOS 105, and/or any other suitable components of information handling system 102, for example via a Universal Serial Bus (USB), System Management Bus (SMBus), and/or one or more other communications channels.

In order to better manage and regulate applications' access to services provided by EC 115, embodiments may provide techniques for detecting and mitigating DOS attacks. For the sake of concreteness, this disclosure will focus on embodiments which communicate via MMIO. As one of ordinary skill in the art with the benefit of this disclosure will appreciate, other embodiments may be implemented in situations in which different communications channels are used.

FIG. 2 illustrates one embodiment in which an application handler implemented at EC 215 is configured to provide policy limits on I/O associated with each application executing on host 202, detect an attack, block the superfluous I/O, and log or report the applications that are violating their policy limits.

At a high level, host 202 may generate an MMIO packet that includes an Application ID (App ID) associated with the requesting application, and the application handler at EC 215 may carry out the following steps:

1. Verify that the application is supported (and not already blocked due to past I/O abuse).
2. Verify that the application is operating within its policy limits.
3. Add any newly detected violating applications to the blocked list or restricted list.
4. After adding the application to the blocked or restricted applications list, log and/or report the violating application. The log may be captured locally, while the reporting may be implemented through a backend server via the host network system (e.g., by raising an ACPI-based Telemetry Event).

Additionally, a filtering layer of the application handler may be configured to either ignore I/O requests from a violating application, or process its requests normally, depending on the circumstances and user preferences.

In order to prevent simple analysis of I/O to extract Application IDs, the transmitted Application ID may be cryptographically secured. For example, it may be implemented as a derived value based on an AES encryption of the true Application ID concatenated with a nonce provided in the I/O packet. The AES key may be derived via Diffie-Hellman exchange during application provisioning (e.g., at installation time).

Turning now to FIG. 3, an example method 300 is shown for operation of an EC application handler, according to some embodiments.

As discussed above, an application handler may execute on an EC in order to implement, update, and use per-application I/O policies. Table 1 below shows one example implementation of a set of I/O policies. As shown, each application listed in Table 1 may have different entries for one or more of the various policy variables. Certain entries in Table 1 also indicate changes that may occur over time as a result of the execution of the EC application handler. For example, an application that tries to issue too many I/O requests may be throttled or blocked.

As shown, the polling period for each application may indicate the amount of time in milliseconds before the application's access count is reset. Some implementations may also allow an application to exceed its normal allotment of I/O accesses in a period by a certain excess allowance, as shown in the I/O Excess Allowance column.

TABLE 1

| Application I/O Policies | | | | |
|---|---|---|---|---|
| App ID | App Status | Poll Period (ms) | Max Request Count (counts per period) | I/O Excess Allowance (counts) |
| 1 | Supported | 1000 | 30 | 3 |
| 2 | Supported | 10 | 2 | 0 |
| 3 | Supported → Restricted | 50 → 1000 | 10 → 3 (throttling down) | 3 → 1 |
| ... | ... | ... | ... | ... |
| N | Supported → Blocked | 100 → 0 | 5 → 0 | 1 → 0 |

In general, the application handler may receive a request at step 302 and verify that the application is supported, and that it is operating within its policy limits at steps 304 and 306. If the application is not supported, then an error may be reported at step 310, and the I/O request may be ignored (or an error response may be returned) at step 316 to block illegitimate applications from accessing the EC.

If the application is already blocked at step 304, then the I/O request may be ignored, and the application's violation counter (discussed below) may be incremented at step 306.

If the application is supported (e.g., regardless of whether it is unrestricted or restricted), and in compliance with its policy, then the request may be processed as shown at steps 312-328 as discussed below.

If the application is supported but has reached its policy limit, then a response indicating that the application should wait a designated remaining time may be sent at step 320.

If the application is supported but is in violation of its policy, then its policy limits may be updated to either block or restrict its access for future access attempts as shown at steps 322-326. The handler may also reset the limits for an application to predefined limits (e.g., as a default policy for violators), or a custom policy depending on the type of application and its priority or importance. Any further attempts at I/O from the violating application may be either blocked and ignored, or restricted/throttled using the updated policy.

For any violations, the handler may create local logs at a storage medium on or accessible to the EC and generate an ACPI Telemetry Event, which may be reported to a backend telemetry server via a software agent. This allows for a manufacturer's centralized monitoring of customer exposure to DOS attacks, as well as learning of any of the manufacturer's own applications that may be inadvertently generating too many I/O requests.

As a first example use case, an application (e.g., App ID 1 from Table 1) may invoke normal access of an MMIO data path as follows. The application has a policy limit of 30 requests and 3 I/O excess counts within a polling period of 1000 ms. An example of a normal use case would be if the application sends 33 requests within 1000 ms, as follows.

Requests #1 through #30 were sent within the first 800 ms of the polling period. These requests would be processed normally according to steps 302, 304, 308, 312, 314, 316, and 328 in FIG. 3.

Requests #31 through #33 would be acknowledged but would receive a response indicating a wait time. This path is shown at steps 302, 304, 308, 312, 318, 320, 316, and 328 in FIG. 3. In particular, suppose that request #31 arrived at time 825 ms. The response may thus indicate a wait time of 175 ms. Request #32 then arrived at time 875 ms, and the response indicates a wait time of 125 ms. Request #33 arrived at time 950 ms, and the response indicates a wait time of 50 ms.

After 1000 ms, the access counter would reset with the polling timer. No I/O throttling is needed in this case, because the 33 transactions completed under the 1000 ms window.

As a second example use case illustrating the violation of a policy, suppose the same application were instead to send more than 33 requests within 1000 ms.

Requests #1 through #30 were sent within the first 800 ms of the polling period, and so they are processed as described above in the first use case.

Requests #31 through #33 were sent between 800 ms and 950 ms and would also be processed as described above in the first use case.

Request #34 was sent at 960 ms and would violate the policy, because it was the first request to exceed the number of the maximum request count plus the I/O excess allowance. Request #34 would then be detected as a violation. This path is shown at steps 302, 304, 308, 312, 318, 322, 324, 326, 316, and 328 in FIG. 3. As shown, the handler triggers an update of the policy to throttle this application and change its limits to reduced numbers. For example, the app status may change from supported to restricted, the max request count may decrease from 30 to 5, and the I/O excess allowance may decrease from 3 to 1. The specific changes may vary from case to case, depending on the application, administrator preferences, EC load level, etc.

This case may also generate an ACPI Telemetry Event so that a software agent can inform a telemetry server of the violating application and any pertinent log information (e.g., the number and degree of violations).

Requests #35+ that were sent between 960 ms and 1000 ms are blocked and ignored, as shown in the path including steps 302, 304, 306, and 328.

After 1000 ms the access counter would reset with the polling timer, but the new policy for the violating application would apply going forward, until the policy is reset.

As a third example use case illustrating the violation of a policy, suppose the same application were instead to execute a DOS attack by sending large numbers of I/O requests in a short time period.

Requests #1 through #30 were sent within the first 100 ms of the polling period, and so they are processed as described above in the first and second use cases.

Requests #31 through #33 were sent between 100 ms and 120 ms and would also be processed as described above in the first and second use cases.

Requests #34-#900 sent at 130 ms would violate the policy. As described above in the second use case above, the application handler detects the violation and triggers an update of the policy to block it and change the limits to 0 (essentially disabling the counts and timers). This is similar to the throttling situation in the second use case, but here (due to the huge number of requests in such a short period), the policy is to block rather than throttle. The application handler would also generate an ACPI Telemetry Event so that a software agent can inform a telemetry server of the violating application and any pertinent log information.

All further requests are blocked and ignored, as was the case for requests #35+ in the second use case. After the 1000 ms poll period expires, any further requests from this application would continue to be blocked and ignored unless and until the policy for this application is reset.

Resetting of the policy for an application may occur automatically after a configurable time period, or it may require manual intervention from an administrator, etc. according to various embodiments.

One of ordinary skill in the art with the benefit of this disclosure will understand that the preferred initialization point for the method depicted in FIG. 3 and the order of the steps comprising the method may depend on the implementation chosen. In these and other embodiments, the method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Thus embodiments of this disclosure may provide many benefits. Embodiments may implement an EC-based capability in information handling systems to regulate I/O in order to prevent DOS attacks. Further, policy-based I/O limits may be implement per provisioned application, which is more flexible than a hard-coded global I/O limit. Additionally, embodiments provide secure EC-based provisioning of authorized applications through Diffie-Hellman exchange at the time the application is installed. Embodiments provide the ability to block DoS issues from misbehaving applications while still servicing non-misbehaving applications. Further, embodiments provide telemetry and logging capabilities to detect DoS attacks on an EC or detect inadvertently misbehaving applications.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke Applicant will recite claim § 112 (f) during prosecution, elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising: at least one host processor; and an embedded controller (EC) including an EC processor coupled to a memory; wherein the information handling system is configured to:
execute an application on the at least one host processor;
provide a communication channel between the application and the EC, wherein the application is configured to issue input/output (I/O) requests to the EC;
execute an application handler on the EC processor, wherein the application handler is configured to: create records indicating the I/O requests and times associated with the I/O requests; and
respond to the I/O requests based on the records and based on a per-application policy, wherein the response is selected from the group consisting of servicing the respective I/O requests, ignoring the respective I/O requests, and throttling the respective I/O requests.

2. The information handling system of claim 1, wherein the per-application policy indicates a maximum number and an excess allowance of I/O requests in a selected time period.

3. The information handling system of claim 1, wherein the application handler is further configured to generate an Advanced Configuration and Power Interface (ACPI) telemetry event based on the records.

4. The information handling system of claim 1, wherein the per-application policy includes a cryptographically secured application identifier associated with each application.

5. The information handling system of claim 1, wherein the communication channel is a memory-mapped I/O (MMIO) channel.

6. A method comprising: an information handling system executing an application on at least one host processor thereof; the information handling system providing a communication channel between the application and an embedded controller (EC) thereof, wherein the application is configured to issue input/output (I/O) requests to the EC; the information handling system executing an application handler on an EC processor of the EC, wherein the application handler is configured to: create records indicating the I/O requests and times associated with the I/O requests; and respond to the I/O requests based on the records and based on a per-application policy, wherein the response is selected from the group consisting of servicing the respective I/O requests, ignoring the respective I/O requests, and throttling the respective I/O requests.

7. The method of claim 6, wherein the per-application policy indicates a maximum number and an excess allowance of I/O requests in a selected time period.

8. The method of claim 6, wherein the application handler is further configured to generate an Advanced Configuration and Power Interface (ACPI) telemetry event based on the records.

9. The method of claim 6, wherein the per-application policy includes a cryptographically secured application identifier associated with each application.

10. The method of claim 6, wherein the communication channel is a memory-mapped I/O (MMIO) channel.

11. An article of manufacture comprising a non-transitory, computer-readable medium having computer-executable code thereon that is executable by an information handling system for: executing an application on at least one host processor thereof; providing a communication channel between the application and an embedded controller (EC) of the information handling system, wherein the application is configured to issue input/output (I/O) requests to the EC; executing an application handler on an EC processor of the EC, wherein the application handler is configured to: create records indicating the I/O requests and times associated with the I/O requests; and respond to the I/O requests based on the records and based on a per-application policy, wherein the response is selected from the group consisting of servicing the respective I/O requests, ignoring the respective I/O requests, and throttling the respective I/O requests.

12. The article of claim 11, wherein the per-application policy indicates a maximum number and an excess allowance of I/O requests in a selected time period.

13. The article of claim 11, wherein the application handler is further configured to generate an Advanced Configuration and Power Interface (ACPI) telemetry event based on the records.

14. The article of claim 11, wherein the per-application policy includes a cryptographically secured application identifier associated with each application.

15. The article of claim 11, wherein the communication channel is a memory-mapped I/O (MMIO) channel.

\* \* \* \* \*